United States Patent
Gupta et al.

(10) Patent No.: US 11,074,185 B2
(45) Date of Patent: Jul. 27, 2021

(54) ADJUSTING A NUMBER OF INSERTION POINTS USED TO DETERMINE LOCATIONS IN A CACHE LIST AT WHICH TO INDICATE TRACKS

(71) Applicant: International Business Machines Corporation, Armonk, NY (US)

(72) Inventors: Lokesh M. Gupta, Tucson, AZ (US); Kyler A. Anderson, Sahuarita, AZ (US); Kevin J. Ash, Tucson, AZ (US); Matthew J. Kalos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 16/534,651

(22) Filed: Aug. 7, 2019

(65) Prior Publication Data
US 2021/0042229 A1 Feb. 11, 2021

(51) Int. Cl.
*G06F 12/123* (2016.01)
*G06F 12/0817* (2016.01)

(52) U.S. Cl.
CPC ........ *G06F 12/0826* (2013.01); *G06F 12/123* (2013.01); *G06F 2212/1024* (2013.01)

(58) Field of Classification Search
CPC .. G06F 12/08; G06F 12/12; G06F 2212/1024; G06F 12/0826; G06F 12/123
USPC ....................................................... 711/133
See application file for complete search history.

(56) References Cited

U.S. PATENT DOCUMENTS

| | | | |
|---|---|---|---|
| 5,606,688 A | 2/1997 | McNutt et al. | |
| 5,765,174 A | 6/1998 | Bishop | |
| 6,105,111 A * | 8/2000 | Hammarlund | G06F 12/123 711/128 |
| 6,615,318 B2 | 9/2003 | Jarvis et al. | |
| 6,842,826 B1 | 1/2005 | McNutt | |
| 9,223,686 B1 | 12/2015 | Gupta et al. | |
| 9,547,604 B2 | 1/2017 | Ash et al. | |
| 9,652,406 B2 | 5/2017 | Ash et al. | |
| 9,710,398 B2 | 7/2017 | Ash et al. | |
| 9,733,991 B2 | 8/2017 | Ash et al. | |
| 10,049,056 B2 | 8/2018 | Ash et al. | |
| 10,078,598 B1 | 9/2018 | Wallace et al. | |
| 2003/0088739 A1 | 5/2003 | Wilkes et al. | |

(Continued)

OTHER PUBLICATIONS

Office Action1, dated Dec. 3, 2020, for U.S. Appl. No. 16/534,705, filed Aug. 7, 2019, Total 20 pages.

(Continued)

*Primary Examiner* — Christopher B Shin
(74) *Attorney, Agent, or Firm* — Konrad, Raynes, Davda and Victor LLP; David W. Victor

(57) ABSTRACT

Provided are a computer program product, system, and method for adjusting a number of insertion points used to determine locations in a cache list at which to indicate tracks. Tracks added to the cache are indicated in a cache list. The cache list has a least recently used (LRU) end and a most recently used (MRU) end. In response to indicating in a cache list an insertion point interval number of tracks in the cache in a cache list, setting an insertion point to indicate one of the tracks of the insertion point interval number of tracks indicated in the cache list. Insertion points to tracks in the cache list are used to determine locations in the cache list at which to indicate tracks in the cache in the cache list.

24 Claims, 9 Drawing Sheets

(56) References Cited

U.S. PATENT DOCUMENTS

| | | | |
|---|---|---|---|
| 2003/0149843 A1* | 8/2003 | Jarvis | G06F 12/123 |
| | | | 711/133 |
| 2004/0193801 A1 | 9/2004 | Benhase et al. | |
| 2005/0283573 A1 | 12/2005 | Mewhinney et al. | |
| 2009/0037660 A1 | 2/2009 | Fairhurst | |
| 2009/0050340 A1* | 2/2009 | McIntyre | A01B 63/10 |
| | | | 172/182 |
| 2011/0107033 A1* | 5/2011 | Grigoriev | G06F 12/0842 |
| | | | 711/129 |
| 2011/0191522 A1 | 8/2011 | Condict et al. | |
| 2014/0008229 A1 | 1/2014 | Garcia et al. | |
| 2015/0026409 A1 | 1/2015 | Ash et al. | |
| 2017/0052822 A1* | 2/2017 | Ash | G06F 9/5083 |
| 2017/0052898 A1* | 2/2017 | Ash | G06F 12/0893 |
| 2017/0091099 A1* | 3/2017 | Greenfield | G06F 12/0848 |
| 2017/0344493 A1* | 11/2017 | Ash | G06F 12/0811 |
| 2017/0351432 A1* | 12/2017 | Ash | G06F 12/0891 |
| 2017/0351611 A1* | 12/2017 | Ash | G06F 12/0891 |
| 2017/0351618 A1* | 12/2017 | Ash | G06F 12/0804 |
| 2018/0373645 A1* | 12/2018 | Anderson | G06F 12/0831 |
| 2019/0034303 A1* | 1/2019 | Anderson | G06F 12/0842 |
| 2019/0391930 A1 | 12/2019 | Gupta et al. | |
| 2021/0042229 A1 | 2/2021 | Gupta et al. | |
| 2021/0042231 A1 | 2/2021 | Gupta et al. | |

OTHER PUBLICATIONS

Response to Office Action, dated Dec. 2, 2020, for U.S. Appl. No. 16/534,676, filed Aug. 7, 2019, Total 9 pages.

Office Action1, dated Sep. 23, 2020, for U.S. Appl. No. 16/534,676, filed Aug. 7, 2019, Total 13 pages.

Anonymous, "An Optimization for Least-Recently-Used Cache Management", dated Jun. 29, 2010, An IP.com Prior Art Database Technical Disclosure for IP.com No. IPCOM000197227D, Total 7 pages.

Anonymous, "Regioned Least Recently Used Destage Algorithm", dated Mar. 15, 2011, An IP.com Prior Art Database Technical Disclosure for IP.com No. IPCOM000205106D, Total 3 pages.

Anonymous, "Method and Apparatus for Dynamic Cache Bypass and Insertion" dated Nov. 20, 2012, An IP.com Prior Art Database Technical Disclosure for IP.com No. IPCOM000223644D, Total 7 pages.

Qureshi et al., "Adaptive Insertion Policies for High Performance Caching" dated 2007, ECE Department The University of Texas at Austin, Total 11 pages.

Qureshi, "Set-Dueling-Controlled Adaptive Insertion for High-Performance Caching" dated 2008, IBM Research, Total 8 pages.

List of IBM Patents and Applications Treated as Related, dated Aug. 7, 2019, Total pp. 2.

U.S. Appl. No. 16/534,666, filed Aug. 7, 2019.
U.S. Appl. No. 16/534,676, filed Aug. 7, 2019.
U.S. Appl. No. 16/534,692, filed Aug. 7, 2019.
U.S. Appl. No. 16/534,705, filed Aug. 7, 2019.

Notice of Allowance, dated Feb. 24, 2021, for U.S. Appl. No. 16/534,666, filed Aug. 7, 2019, Total 36 pages.

Notice of Allowance, dated Feb. 18, 2021, for U.S. Appl. No. 16/534,705, filed Aug. 7, 2019, Total 16 pages.

Notice of Allowance, dated Feb. 16, 2021, for U.S. Appl. No. 16/534,676, filed Aug. 7, 2019, Total 20 pages.

Response to Office Action1, dated Jan. 30, 2021, for U.S. Appl. No. 16/534,705, filed Aug. 7, 2019, total 11 pages.

* cited by examiner

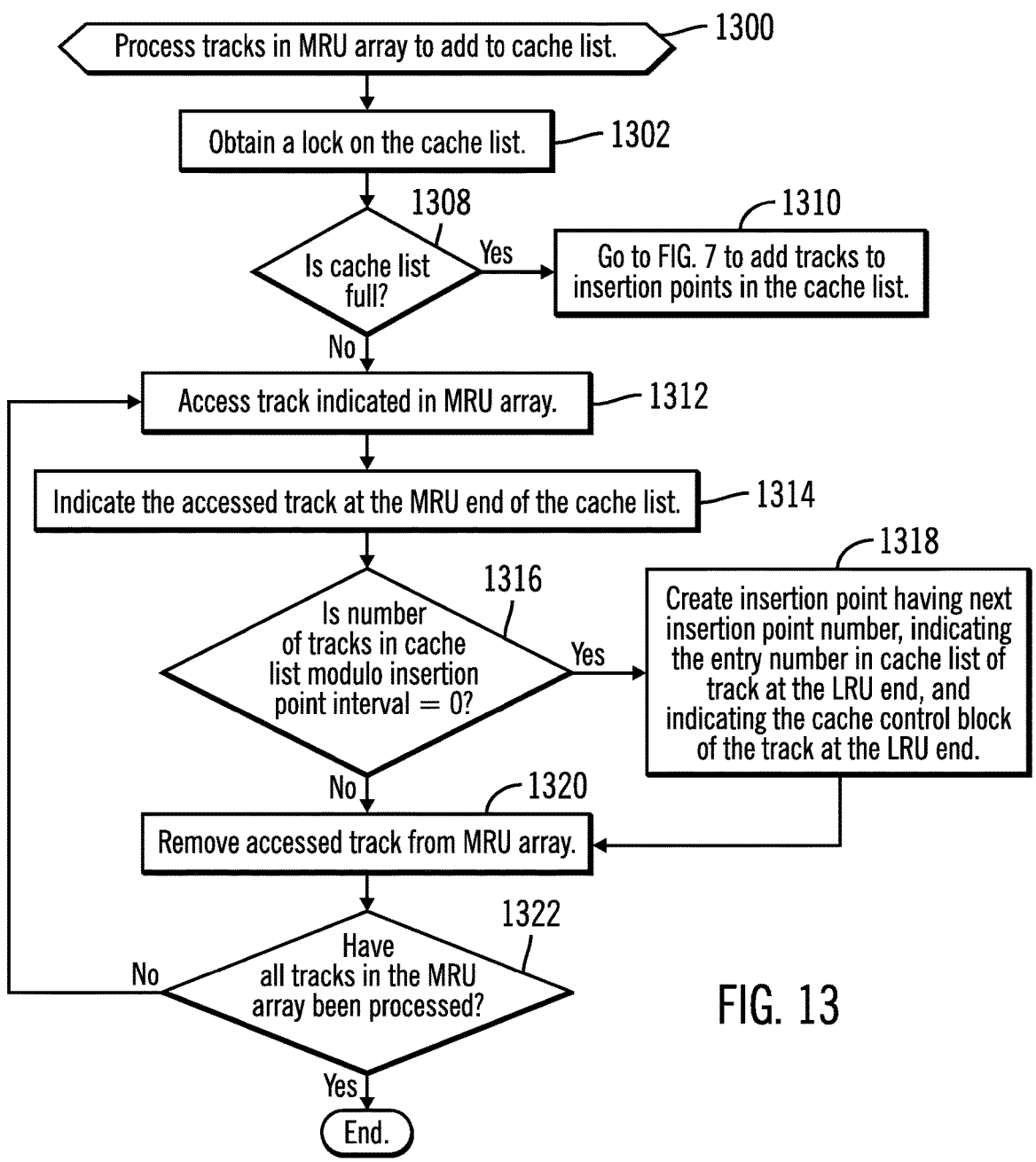

ADJUSTING A NUMBER OF INSERTION POINTS USED TO DETERMINE LOCATIONS IN A CACHE LIST AT WHICH TO INDICATE TRACKS

BACKGROUND OF THE INVENTION

1. Field of the Invention

The present invention relates to a computer program product, system, and method for adjusting a number of insertion points used to determine locations in a cache list at which to indicate tracks.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU cache list for the accessed track is moved to a Most Recently Used (MRU) end of the list. If the requested track is not in the cache, i.e., a cache miss, then the track in the cache whose entry is at the LRU end of the list may be removed and demoted and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

In order to move a track to the MRU end when it is accessed, the process managing the cache needs to obtain a lock on the LRU cache list. Since this lock is highly sought by many processes, there may be substantial lock contention to obtain the lock.

One technique to address lock contention is to batch the tracks that need to be moved to the MRU end in an MRU array. When the MRU array is full, all the tracks in the MRU array are moved to the MRU end of the cache list. Another technique to address lock contention is cache partitioning where multiple LRU lists are maintained for different partitions of track where each partition has its own LRU lock.

There is a need in the art for improved techniques for moving tracks toward the MRU end of the cache when accessed.

SUMMARY

Provided are a computer program product, system, and method for adjusting a number of insertion points used to determine locations in a cache list at which to indicate tracks. Tracks added to the cache are indicated in a cache list. The cache list has a least recently used (LRU) end and a most recently used (MRU) end. In response to indicating in a cache list an insertion point interval number of tracks in the cache in a cache list, setting an insertion point to indicate one of the tracks of the insertion point interval number of tracks indicated in the cache list. Insertion points to tracks in the cache list are used to determine locations in the cache list at which to indicate tracks in the cache in the cache list.

BRIEF DESCRIPTION OF THE DRAWINGS

FIG. 12 illustrates an embodiment insertion point management information used to adjust the number of insertion points maintained for a cache list.

FIG. 13 illustrates an embodiment of operations to create insertion points as tracks are indicated in the cache list.

DETAILED DESCRIPTION

Figure 1:
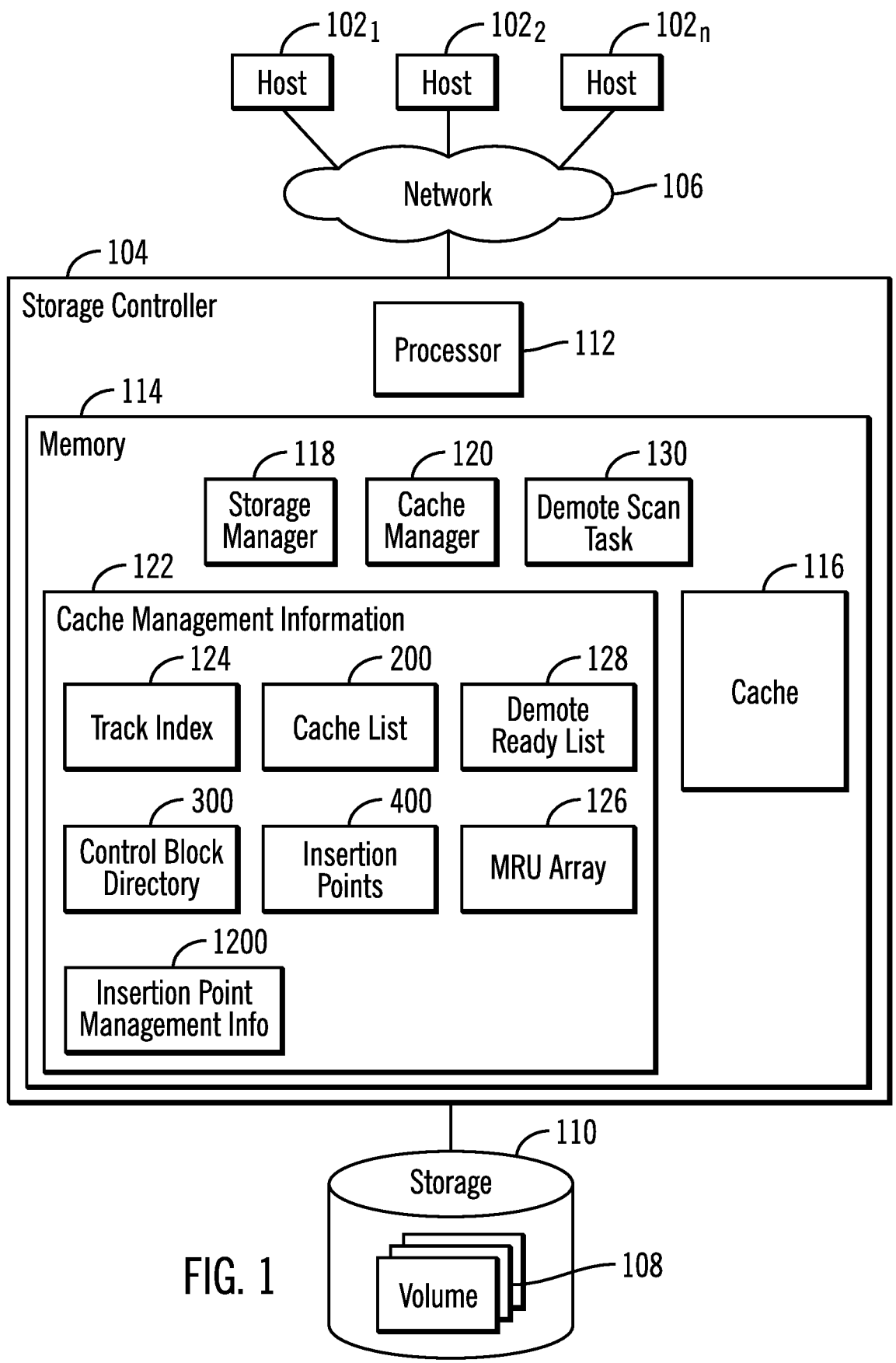
FIG. 1 illustrates an embodiment of a computing environment.

In current art, tracks that are accessed may be batched and then the batch of tracks are repositioned at the MRU end of the cache list. However, because a period of time may have lapsed since the accessed tracks in a batch are processed, their appropriate position in the LRU list based on the time they were last accessed may not be at the MRU end, which may have tracks more recently accessed.

Described embodiments provide improvements to computer caching technology to add batched tracks to a cache list by using insertion points to determine where to position accessed tracks in the LRU list when their movement to the MRU end is delayed to process in a batch. With described embodiments, there are a plurality of insertion points to a cache list where each insertion point of the insertion points identifies a track in the cache list at different intervals of tracks. When a track is ready to move to the MRU end, a determination is made of an insertion point of the insertion points at which to move the processed track, which may be an insertion point having a timestamp closest to the time the track was last accessed. The track is then indicated at a position in the cache list with respect to the determined insertion point.

The described embodiments place accessed tracks that are delayed in moving to the MRU end at a location in the cache list that includes other entries having a last accessed time closest to the time the track was last accessed. This use of insertion points maintains the temporal integrity of the cache list to ensure that tracks having similar last accessed times are demoted together, which improves the cache hit ratio.

Cache resources are required to manage insertion points in the cache, including to search insertion points to determine a location in the cache list at which to indicate a track to add to the MRU end and to adjust the insertion points when tracks are added to the cache list to maintain a fixed insertion point track interval number of tracks between each insertion point. These insertion point management operation may increase cache latency.

Described embodiments provide further improvements to manage insertion points maintained for a cache list by adding an insertion point to a cache list for every insertion point interval number of tracks added to the cache list to maintain a fixed insertion point interval number of tracks between each two insertion points in the cache list. Described embodiments further adjust the number of insertion points maintained for a cache based on a change of operating conditions, such as a change in cache size, track size, total cache residency time during which tracks were last accessed while in cache and cache latency. For instance, if cache latency is below a low threshold, then the number of insertion points may be increased to provide more accurate insertion of tracks in the cache list at a location near tracks with a similar last accessed time. If the cache latency is relatively high, such as above a high threshold, then the number of insertion points maintained for the cache list may be reduced to reduce the cache resources needed for insertion point management. Further, the number of insertion points may be increased or decreased based on changes to other cache conditions, such as changes to cache size, track size, and total cache residency time.

FIG. 1 illustrates an embodiment of a computing environment. A plurality of hosts $102_1$, $102_2$ ... $102_n$ may submit Input/Output (I/O) requests to a storage controller 104 over a network 106 to access data at volumes 108 (e.g., Logical Unit Numbers, Logical Devices, Logical Subsystems, etc.) in a storage 110. The storage controller 104 includes one or more processors 112 and a memory 114, including a cache 116 to cache data for the storage 110. The processor 112 may comprise a separate central processing unit (CPU), one or a group of multiple cores on a single CPU, or a group of processing resources on one or more CPUs. The cache 116 buffers data transferred between the hosts $102_1$, $102_2$ ... $102_n$ and volumes 108 in the storage 110.

The memory 114 further includes a storage manager 118 for managing the transfer of tracks transferred between the hosts $102_1$, $102_2$ ... $102_n$ and the storage 110 and a cache manager 120 that manages data transferred between the hosts $102_1$, $102_2$ ... $102_n$ and the storage 110 in the cache 116. A track may comprise any unit of data configured in the storage 110, such as a track, Logical Block Address (LBA), storage cell, group of cells (e.g., column, row or array of cells), sector, segment, etc., which may be part of a larger grouping of tracks, such as a volume, logical device, etc.

The cache manager 120 maintains cache management information 122 in the memory 114 to manage read (unmodified) and write (modified) tracks in the cache 116. The cache management information 122 may include a least recently used (LRU) cache list 200 in which to indicate tracks in the cache 116; a track index 124 providing an index of tracks in the cache 116 to cache control blocks in a control block directory 300, where there is one cache control block for each track in the cache 116 providing metadata on the track in the cache 116 and the cache list 200 may indicate cache control blocks $300_i$ in the directory 300; insertion points 400 that point to tracks in the cache list 200, such as every Nth track; a most recently used (MRU) array 126, also referred to as an MRU list, having tracks added to the cache 116 that have not yet been indicated in the cache list 200 to allow batches of tracks to be added to the cache list 200 at once to improve cache processing efficiency because a single lock request may be used to add multiple newly added tracks to the cache 116 in the cache list 200; a demote ready list 128 indicating tracks removed from an LRU end of the cache list 200 that are ready to demote from the cache 116; and insertion point management information 1200 used to gather information to determine an insertion point track interval number of tracks at which insertion points are added.

The processor 112 executes a demote scan task 130 to scan the cache list 200 to determine unmodified tracks to add to the demote ready list 128.

The storage manager 118, cache manager 120, and demote scan task 130 are shown in FIG. 1 as program code loaded into the memory 114 and executed by one or more of the processors 112. Alternatively, some or all of the functions may be implemented as microcode or firmware in hardware devices in the storage controller 104, such as in Application Specific Integrated Circuits (ASICs).

The storage 110 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 114 may comprise a suitable volatile or non-volatile memory devices, including those described above.

The network 106 may comprise a Storage Area Network (SAN), a Local Area Network (LAN), a Wide Area Network (WAN), the Internet, and Intranet, etc. Alternatively, the hosts $102_1$, $102_2$ ... $102_n$ may connect to the storage controller 104 over a bus interface, such as a Peripheral Component Interconnect (PCI) bus interface and other interfaces known in the art.

Figure 2:
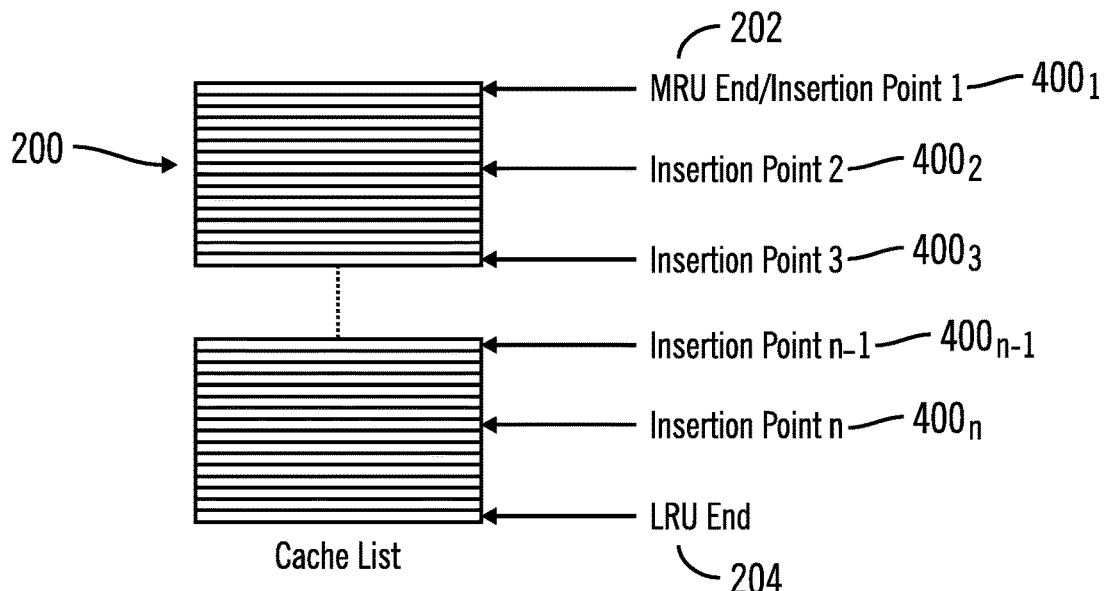
FIG. 2 illustrates an embodiment of a Least Recently Used (LRU) list.

FIG. 2 illustrates an embodiment of the cache list 200 as a Least Recently Used (LRU) list 200, having a most recently used (MRU) end 202 identifying a track most recently added to the cache 116 or most recently accessed in the cache 116 and a least recently used (LRU) end 204 from which the track identified at the LRU end 204 is selected to demote from the cache 116. The MRU end 202 may also be associated with a first insertion point $400_1$. Subsequent insertion points $400_2, 400_3 \ldots 400_{n-1}, 400_n$ are added as the cache list 200 fills up as tracks are added to the cache 116. There may be an insertion point $400_i$ added every N number of tracks, so as a next Nth track is added/indicated to the cache list 200, a new insertion point $400_i$ is added. For instance, upon adding the (i*N)th track, insertion point (i+1) is added to point to the (i*N)th track in the cache list 200.

As a track is added to the MRU end 202/first insertion point $400_1$, other tracks move downward toward the LRU end 204. If there is not sufficient space for the track being added to the MRU end 202, then a track may be demoted from the LRU end 204 to make room for the new track being added to the cache list 200.

Figure 3:
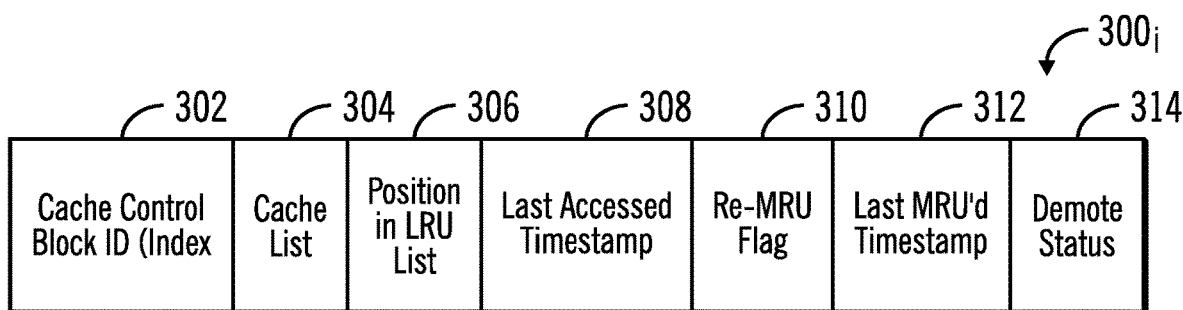
FIG. 3 illustrates an embodiment of a cache control block.

FIG. 3 illustrates an embodiment of an instance of a cache control block $300_i$ for one of the tracks in the cache 116, including, but not limited to, a cache control block identifier 302, such as an index value of the cache control block $300_i$; the cache list 304 in which the track associated cache control block $300_i$ is indicated; a position in the LRU cache list 306 where the track is indicated; a last accessed timestamp 308 indicating a time the track was last accessed in the cache 116, such as read; a re-MRU flag 310 indicating whether the track needs to be added toward the MRU end 202 of the cache list 200, such as if the track is accessed while indicated in the cache list 200; last MRU'd timestamp 312 indicating timestamp of when the track was last MRU'd or moved to an insertion point $400_i$ in the cache list 200; and a demote status 314 indicating whether the track identified by the cache control block $300_i$ is to be demoted from the cache 116 and indicated in the demote ready list 128. Additional information may be included in the cache control block $300_i$ not mentioned herein that is used to manage the track in the cache 116.

In certain embodiments, the timestamps 308, 312 may be set to a sequence number that that is periodically incremented, such as at every clock cycle or couple of milliseconds.

Figure 4:
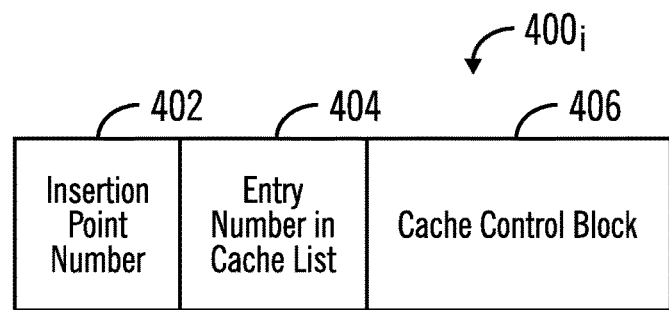
FIG. 4 illustrates an embodiment of an insertion point.

FIG. 4 illustrates an embodiment of an insertion point $400_i$, where there may be an insertion point $400_1$ pointing to the MRU end 202 of the cache list 200 and a further insertion point $400_i$ added to point to every Nth number of tracks in the cache list 200, so that there are N tracks indicated in the cache list 200 between any two insertion points $400_i$ and $400_{i+1}$. Each insertion point $400_i$ may include an insertion point number 402 indicating the number of the insertion point, such that an ith number may point to an (i−1)*Nth track in the cache list 200; an entry number 404 in the cache list 200 to which the insertion point points, e.g., (i−1)*Nth entry or other entry if adjusted; and a cache control block 406 identifying a track addressed/pointed to by the insertion point $400_1$.

Figure 5:
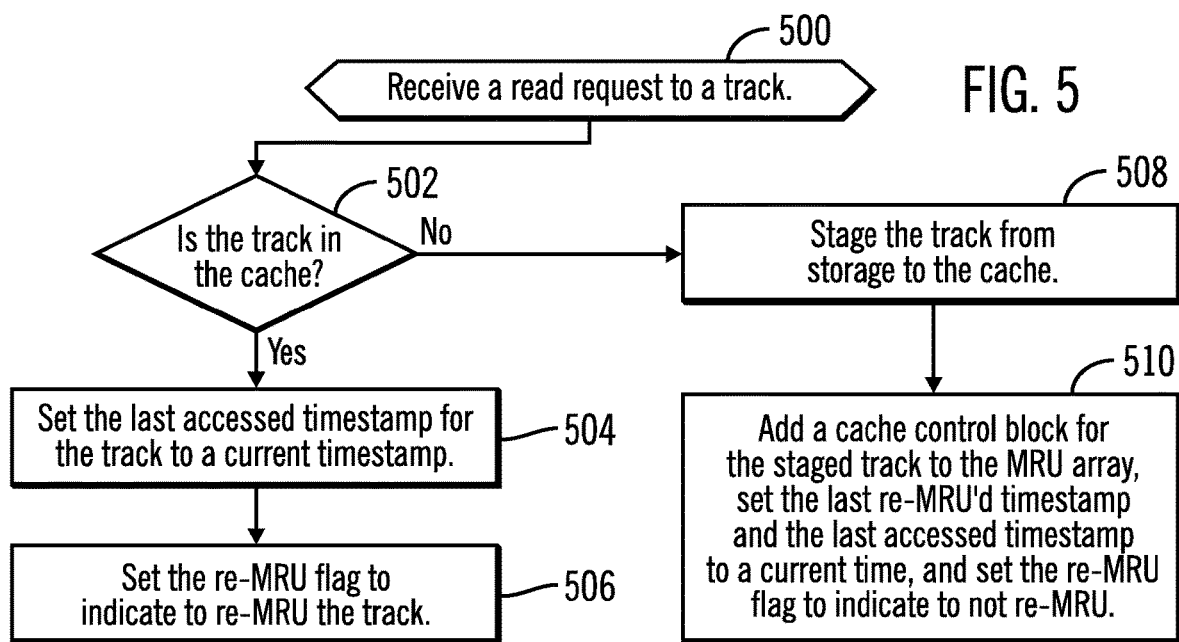
FIG. 5 illustrates an embodiment of operations to process a read request to a track.

FIG. 5 illustrates an embodiment of operations performed by the cache manager 120 to process a read request to a track. Upon receiving (at block 500) a read request, if (at block 502) the track is in the cache 116, then the last accessed timestamp 308 in the cache control block $300_i$ for the read track is set (at block 504) to a current system timestamp and the re-MRU flag 310 is set (at block 506) to indicate the track needs to be moved toward the MRU end 202, or to an appropriate insertion point $400_i$. If (at block 502) the track to read is not in the cache 116, the track is staged (at block 508) from the volume 108 to the cache 116. A cache control block $300_i$ for the staged track is added (at block 510) to the MRU array 126, the last re-MRU'd timestamp 312 and the last accessed timestamp 308 are set to a current timestamp, and the re-MRU flag 310 is set to indicate to not re-MRU.

With the embodiment of FIG. 5, a requested track indicated in the cache list 200 is not immediately moved to the MRU end 202, but instead the moving of the track to the MRU end 202 is delayed until a later time when multiple tracks can be moved to the appropriate insertion point $400_i$ in the cache list 200. This avoids the latency and lock contention required to immediately move an accessed track to the MRU end 202 after access. Instead, the accessed track is indicated through the flag 310 as needing to be re-MRU'd and may be moved to a higher insertion point in the cache list 200 in batch where the lock to the cache list 200 may be accessed once to use to re-MRU multiple tracks to higher insertion points $400_i$ in the cache list 200 towards the MRU end 202. This reduces lock contention and latency in processing the cache list 200, which reduces latency for processing I/O requests. Further, new tracks staged into cache 116 are added to the MRU array 126 so that they may in batch be indicated in the cache list 200 at insertion points $400_i$ having timestamps close to the time the new track was added to the cache 116.

Figure 6:
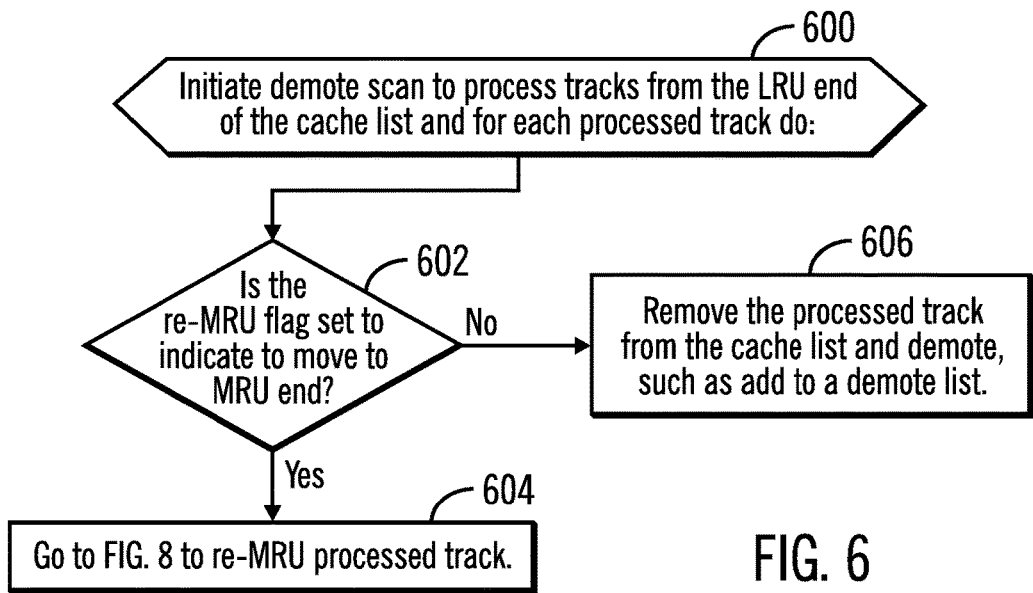
FIG. 6 illustrates an embodiment of operations to initiate a demote scan to demote tracks from the LRU end of the cache list.

FIG. 6 illustrates an embodiment of operations performed by the demote scan task 130 periodically invoked to process tracks from the LRU end 204 of the cache list 200 to demote from cache. Upon processing (at block 600) a track to demote at the LRU end 204, if (at block 602) the re-MRU flag 310 indicates to re-MRU or move the track toward the MRU end 202, then control proceeds (at block 604) to FIG. 8 to re-MRU the processed track. If (at block 602) the re-MRU flag 310 is not set, indicating the track was not recently accessed since last added to the cache 116 or re-MRU'd to an insertion point $400_i$, then the processed track is removed (at block 606) from the cache list 200 and demoted, such as added to the demote ready list 128, from where tracks are removed from cache 116.

With the embodiment of FIG. 6, only tracks are removed from the LRU end 204 that do not have the re-MRU flag 310 set, which indicates the track was not accessed since being added to the cache list 200 or re-MRU'd to an insertion point $400_i$ in the cache list 200. If a track was accessed while in the cache list 200 and indicated as needing to be re-MRU'd, i.e., moved upward toward an insertion point $400_i$, then that track is not demoted and re-MRU'd according to FIG. 8. Since the demote scan task 130 is holding the lock to the cache list 200, tracks can be re-MRU'd to an insertion point $400_i$ without having to incur latency from lock contention for each track to obtain the lock to access the cache list 200, but instead the lock is obtained once to re-MRU multiple tracks.

Figure 7:
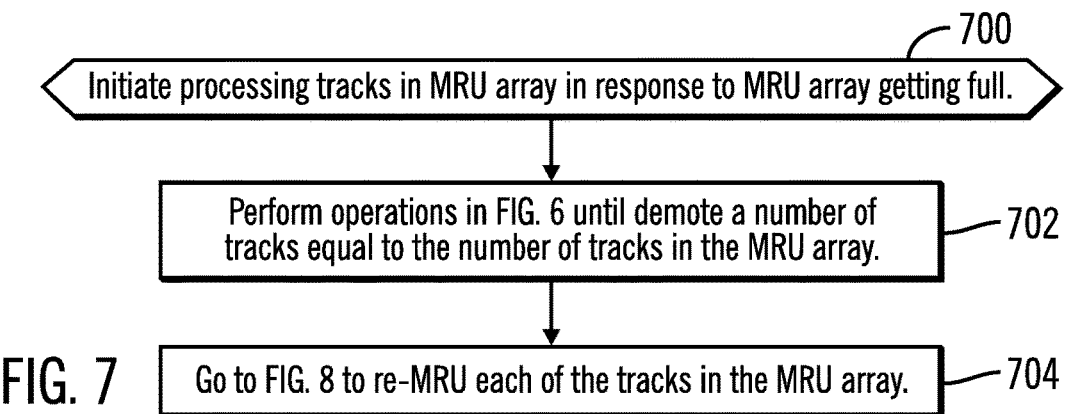
FIG. 7 illustrates an embodiment of operations to process tracks added to the cache but not added to the cache list that are maintained in an MRU array.

FIG. 7 illustrates an embodiment of operations performed by the cache manager 120 and/or demote scan task 130 to process the MRU array 126 to add tracks to an insertion point $400_i$ based on when they were added to the cache 116, but not yet added to the cache list 200. The MRU array 126 may be processed when the number of tracks equals a threshold or the array 126 is full. Upon initiating (at block 700) processing of tracks in the MRU array 126, control proceeds to perform operations of FIG. 6 until the demote scan task 130 demotes a number of tracks equal to the number of tracks in the MRU array 126 to add to the cache list 200. Control then proceeds (at block 704) to FIG. 8 to re-MRU each of the tracks in the MRU array 126.

With the embodiment of FIG. 7, tracks added to the cache 116 are not immediately indicated to the MRU end 202, which would cause latency delays to obtain a lock to the cache list 200. Instead, tracks added to the cache 116 are indicated in the MRU array 126 and batched processed to move to an insertion point 400$_i$, i.e., re-MRU'd, while the lock is held for the cache list 200, to avoid lock contention to move a track to the MRU end 202 immediately when adding to the cache 116.

Figure 8:
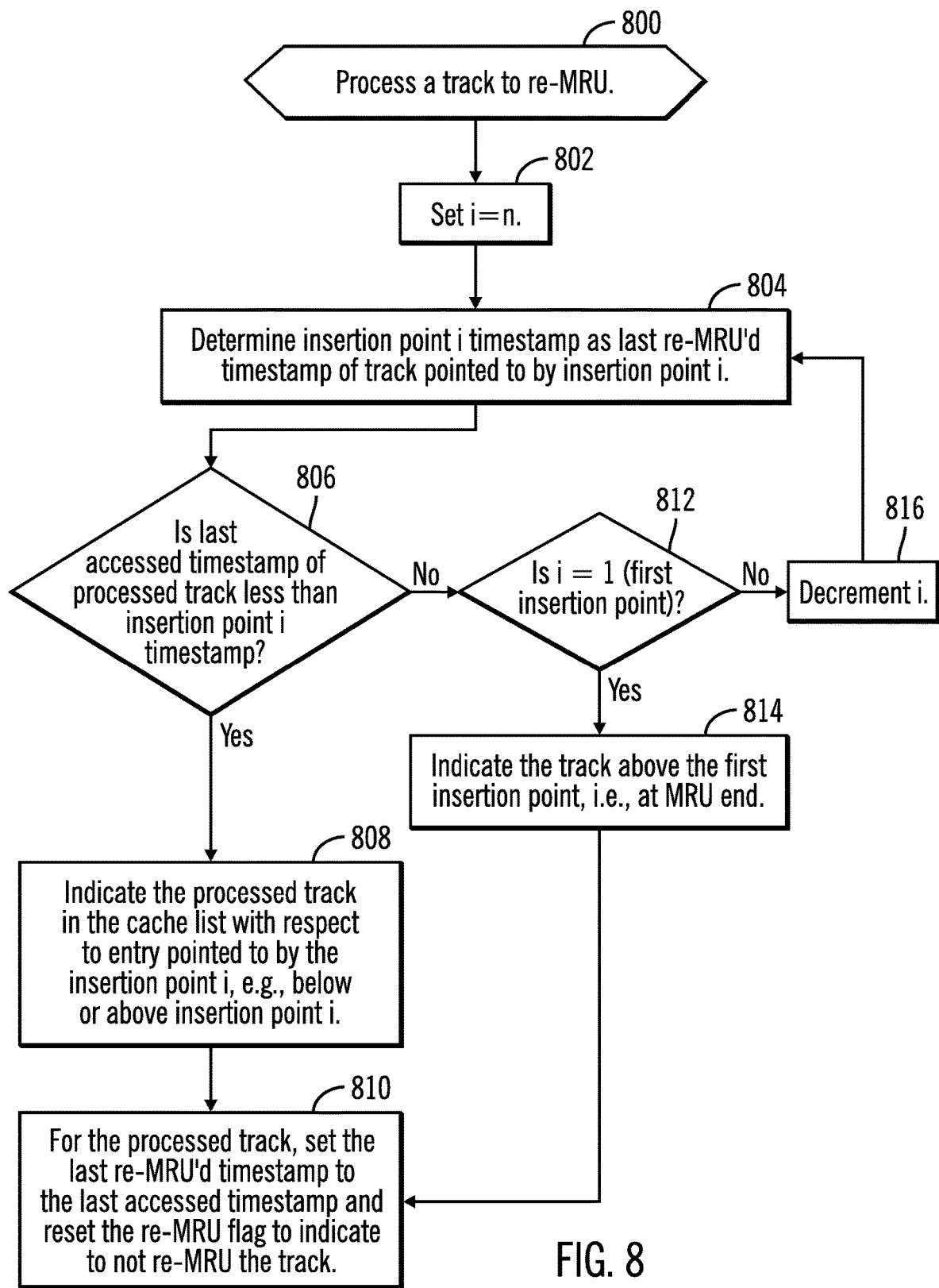
FIG. 8 illustrates an embodiment of operations to move a track to an insertion point in the cache list.

FIG. 8 illustrates an embodiment of operations performed by the cache manager 120 and/or demote scan task 130 to re-MRU a track to an insertion point 400$_i$ in the cache list 200. Upon processing (at block 800) a track, a variable i is set (at block 802) to n for the first insertion point above the LRU end 204 of the cache list 200. The insertion point 400$_i$ timestamp is determined (at block 804) as the last re-MRU'd timestamp 312 for the track/entry in the cache list 200 pointed to by insertion point 400$_i$. If (at block 806) the last accessed timestamp 308 of the processed track is less than the insertion point 400$_i$ timestamp, then the processed track is indicated (at block 808) in the cache list 200 with respect to the entry 404 pointed to by the insertion point 400$_i$. The track may be inserted above or below the entry 404 pointed to by the determined insertion point 400$_i$. For the processed track cache control block 300$_i$, the last re-MRU'd timestamp 312 is set (at block 810) to the last accessed timestamp 308 of the processed track and the re-MRU flag 310 is reset to indicate to not re-MRU the track.

If (at block 806) the last accessed timestamp 308 of the processed track is greater than insertion point 400$_i$ timestamp, then if (at block 812) i is equal to one, i.e., the first insertion point 400$_1$ pointing to the MRU end 202, then the track is indicated (at block 814) above the first insertion point 400$_1$ at the MRU end 202. From block 814, control proceeds to block 810 to update the last re-MRU'd timestamp 312 and the re-MRU flag 310. If i is not the first insertion point or one, then i is decremented (at block 816) and control proceeds to block 804 to process the next insertion point 400$_{i-1}$ in the cache list 200 toward the MRU end 202.

At blocks 808 and 814, when indicating a track with respect to the insertion point when processing tracks in a processor array 132 (as in FIG. 7), if the track is not indicated in the cache list 200, then a new indication is made of the track in the cache list 200. Otherwise, if the track to indicate in the cache list 200 at blocks 808 and 814 is already in the cache list 200, then indication of that track is moved to the location associated with the insertion point 400$_i$.

With the embodiment of FIG. 8, a track is added to a position in the cache list 200 with respect to an insertion point 400$_i$ having a timestamp closest to the last time the track was accessed in the cache. In this way, a track is added to a position in the cache list 200 toward the MRU end 202 based on its time of last access so the track is added to a location with respect to other tracks having a similar last time accessed, so it remains in the cache list 200 for a time commensurate with the last accessed timestamps of other tracks. This allows tracks to be moved toward the MRU end 202 in a batch and ensure that the track is added to a location in the cache list 200 adjacent to tracks having a similar last accessed time, tracks in temporal proximity. This improves the cache hit ratio because tracks are added to the cache list 200 at a location based on the length of time the track was last accessed, so a track accessed a relatively longer time ago is added to a position closer to the LRU end 204 than a track accessed relatively more recently is added to a position closer to the MRU end 202. This allows the adjustment of an accessed track in the cache list 200 to be delayed to allow batching of moving tracks toward the MRU end 202 so the tracks are demoted at the same time as tracks last accessed at a similar time, to maintain the cache hit ratio.

Figure 9:
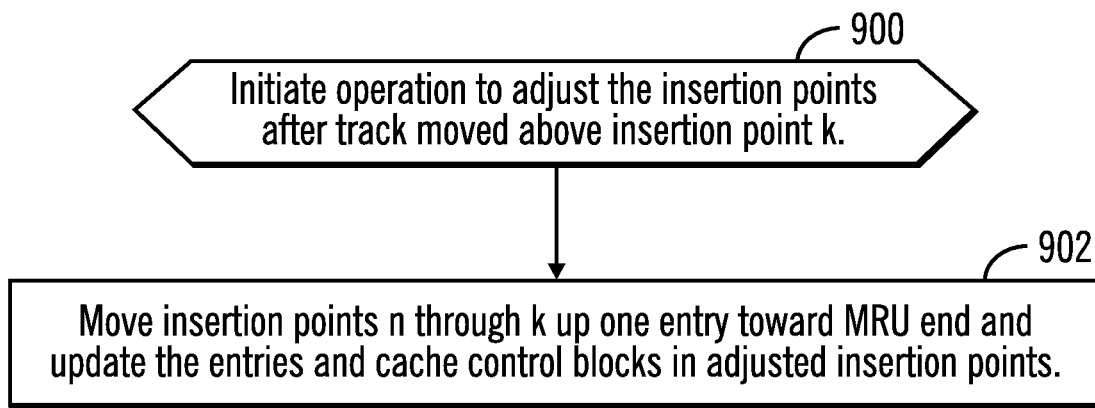
FIG. 9 illustrates an embodiment of operations to adjust the insertion points after moving a track above an insertion point.

FIG. 9 illustrates an embodiment of operations performed by the demote scan task 130 and/or cache manager 120 to adjust one insertion point 400$_k$ immediately after adding a track above insertion point k. Upon initiating (at block 900) the adjustment immediately after adding the track above insertion point 400$_k$, insertion points 400$_n$ through 400$_k$ are each moved (at block 902) one entry up toward MRU end 202 and, for each moved insertion point 400$_i$ the entry 404 and cache control block 406 are adjusted to point to the new entry and cache control block 300$_i$ for the added track.

Figure 10:
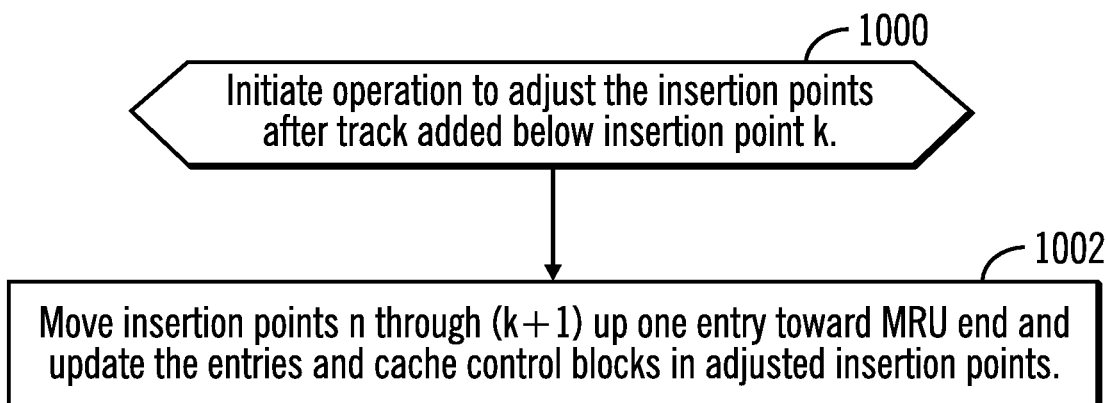
FIG. 10 illustrates an embodiment of operations to adjust the insertion points after moving a track below an insertion point.

FIG. 10 illustrates an embodiment of operations performed by the demote scan task 130 and/or cache manager 120 to adjust one insertion point 400$_k$ immediately after adding a track below insertion point k. Upon initiating (at block 1000) the adjustment immediately after adding the track below insertion point 400$_k$, insertion points 400$_n$ through 400$_{k+1}$ are each moved (at block 1002) one entry up toward the MRU end 202 and, for each moved insertion point, the entry 404 and cache control block 406 are adjusted to point to the new entry and cache control block 300$_i$ for the added track.

Figure 11:
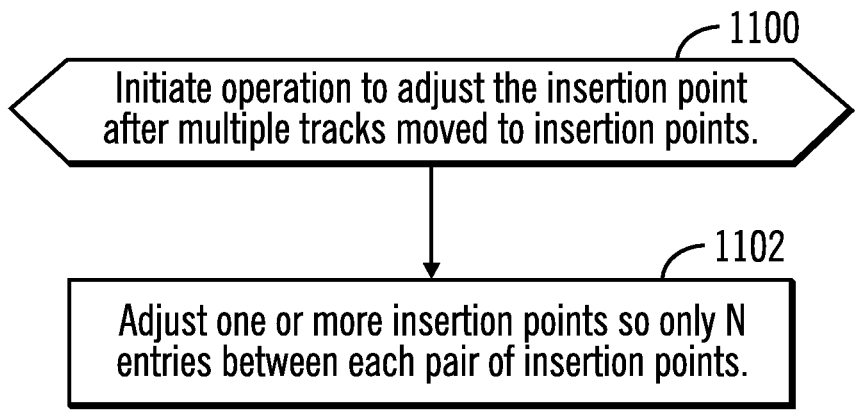
FIG. 11 illustrates an embodiment of operations to adjust the insertion points after multiple tracks are moved to insertion points.

FIG. 11 illustrates an embodiment of operations performed by the demote scan task 130 and/or cache manager 120 to adjust one or more of the insertion points after moving multiple tracks to insertion points according to FIG. 8. Upon initiating (at block 1100) to adjust the insertion points after moving multiple tracks, one or more of the insertion points are adjusted (at block 1102) to ensure that there are only N entries, such as a fixed number of entries, between each pair of insertion points, that the first insertion point 400$_1$ points to the MRU end 202 of the cache list 200, and that there are N entries between the LRU end 204 and the last insertion point 400$_n$. Insertion points 400$_i$ may be moved upward toward the MRU end 202 to adjust.

With the embodiment of FIG. 11, the adjustment of the insertion points 400$_i$ is delayed until a plurality of tracks are moved to insertion points, i.e., re-MRU'd, to batch the adjustment of insertion points. The operations of FIG. 11 optimize the insertion pointer adjustment operations by moving the insertion point multiple entries at once to batch the processing which improves performance.

FIG. 12 illustrates an embodiment of the insertion point management information 1200 used to calculate an insertion point track interval comprising an interval of tracks between insertion points 400$_i$ to the cache list 200, including an insertion point track interval 1202 comprising a number of tracks to maintain between adjacent insertion points 400$_i$ and 400$_{i+1}$/400$_{i-1}$ in the cache list; a cache size 1204 comprising a size of the cache 116; a track size 1206 comprising a size of each track in the storage 110 and cache 116; a cache track capacity 1208 comprising the cache size 1204 divided by the track size 1206 indicating a number of tracks that are capable of being stored in the cache 116; a total cache residency time 1210 comprising a difference of the last accessed timestamp 308 of a track at the MRU end 202 was last accessed and a last accessed timestamp 308 of a track at the LRU end 204 was last accessed; an insertion point time differential 1212 indicating a time differential of tracks between two insertion points 400$_i$; and a total number of insertion points 1214 comprising the total cache residency time 1210 divided by the insertion point dime differential 1212. The insertion point track interval 1202 may be calculated by dividing the cache track capacity 1208 divided by the total number of insertion points 1214.

The insertion point time differential 1212 is used to determine the total number of insertion points for the cache list 200. Reducing the insertion point time differential 1212 increases the number of insertion points to provide more fine grained control to allow more accurate temporal locality of placement of tracks in the cache list 200 based on their last accessed timestamp 308. However, increasing the number of insertion points 1214 to improve temporal placement of tracks in the cache list increases the time needed to determine an insertion point at which to add a track according to FIG. 8 and increases the computational resources needed to adjust the insertion points in FIGS. 9-11 if cache latency is to be maintained constant. Thus, increasing the number of insertion points 1214 may increase cache access latency unless additional computation resources are directed to insertion point management operations. Likewise, decreasing the number of insertion points 1214 may decrease cache access latency and allow for reduction of an amount of computation resources directed to insertion point management operations.

The insertion point management information 1200 may be set to default values based on the cache 1204 and track sizes 1206 and later be adjusted during caching operations.

FIG. 13 illustrates an embodiment of operations performed by the cache manager 120 to process tracks in the MRU array 126 to batch add tracks to the cache list 200. Alternatively, the operations of FIG. 13 may be performed if adding a track directly to the cache list 200 without using the MRU array 126. Upon processing (at block 1300) tracks in the MRU array 126, a lock is obtained (at block 1302) on the cache list 200. If (at block 1308) the cache list 200 is full, then control proceeds (at block 1310) to FIG. 7 to demote tracks from the LRU end 204 to make space in the cache list 200 to indicate the tracks from the MRU array 126 at insertion points 400$_i$ in the cache list 200. If (at block 1308) the cache list 200 is not full, i.e., tracks can be added without demoting tracks already indicated in the cache list 200, then a track indicated in the MRU array 126 is accessed (at block 1312), such as the oldest track indicated in the MRU array 126. The accessed track is indicated (at block 1314) at the MRU end 202 of the cache list 200.

If (at block 1316) the number of tracks in the cache list 200 modulo the insertion point track interval 1202 is zero, i.e., the insertion point interval number of tracks 1202 was added to the cache list 200 since the last added insertion point 400$_i$, then a new insertion point 400$_{i+1}$ is created (at block 1318) to indicate the insertion point number 402, i.e., next insertion point number, the entry number in the cache list 404 having the track closest to the LRU end 204, and indicate the cache control block 406 of the track at the LRU end 204. After creating an insertion point 400$_{i+1}$ at block 1318 or if the modulo operation (at block 1316) is not 0, i.e., less than the insertion point interval number of tracks 1202 were added since the last insertion point, then the accessed track is removed (at block 1320) from the MRU array 126. If (at block 1322) there are tracks remaining in the MRU array 126 to add to the cache list 200, e.g., the MRU array 126 is not empty, then control returns to block 1312 to process the next track indicated in the MRU array 126. Otherwise, if all tracks in the MRU array 126 were processed, e.g., the MRU array 126 is empty, then control ends.

With the operations of FIG. 13, as tracks are added to the cache list 200, an insertion point 400$_i$ is created at every insertion point interval number of tracks 1202 to distribute the insertion points 400$_i$ through the cache list 200 at even track intervals.

Figure 14:
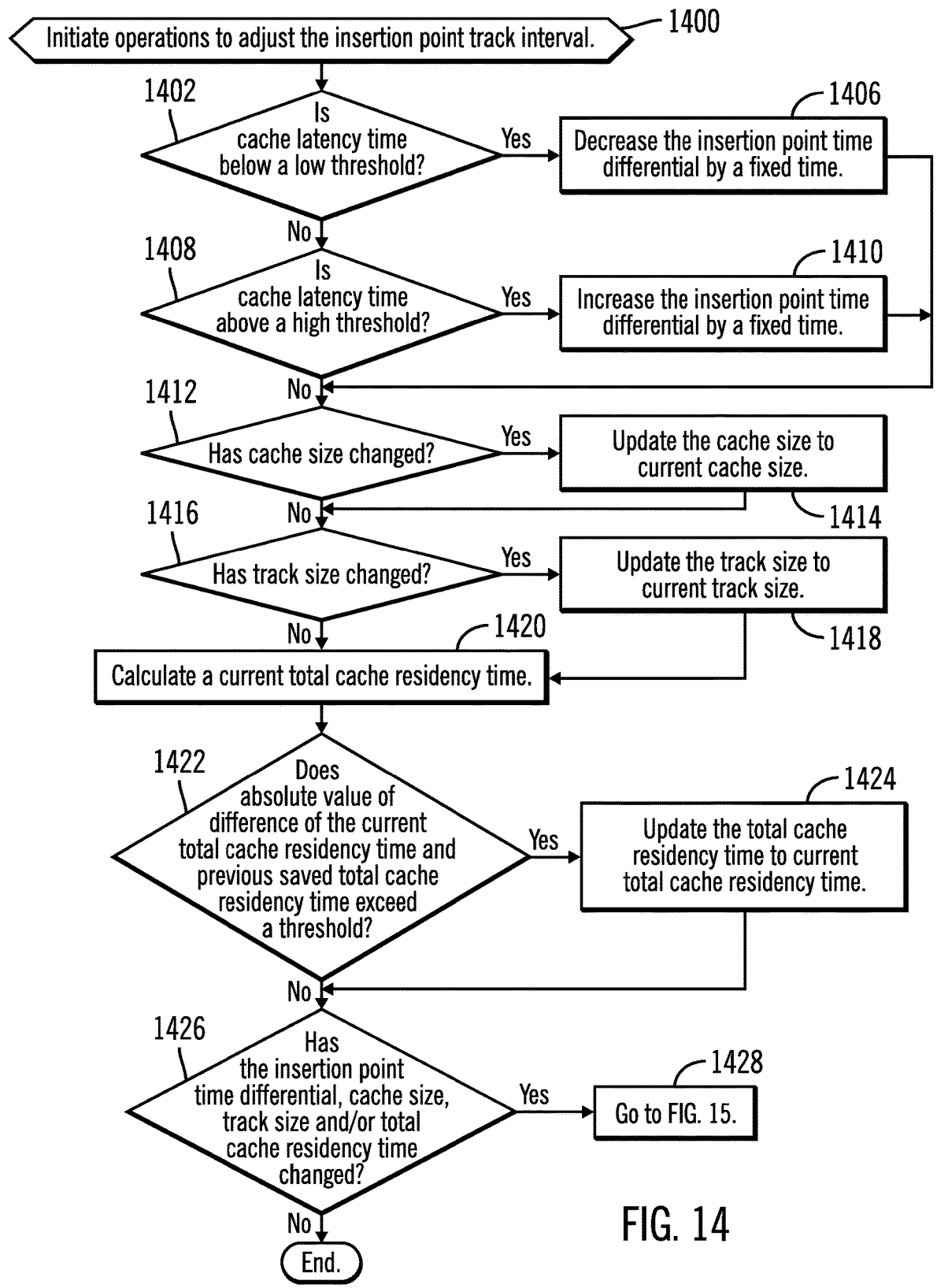
FIG. 14 illustrates an embodiment of operations to determine whether to adjust variables used to determine the number of insertion points for a cache list.

FIG. 14 illustrates an embodiment of operations performed by the cache manager 120 to adjust the insertion point track interval 120 based on changed operating conditions of the cache 116. Upon initiating (at block 1400) adjustment operations, if (at block 1402) a cache 116 latency time, which may be periodically gathered, is below a low threshold, indicating low latency, then the insertion point time differential 1212 may be decreased (at bock 1406), such as by a fixed time, to increase the total number of insertion points 1241, which improves the accuracy of temporal placement of tracks in the cache list 200 while having a negative impact on cache latency. If (at block 1402) the cache latency is not below the threshold, then a determination is made (at block 1408) whether the cache latency time is above a high threshold. If so, then the insertion point time differential 1212 is increased, such as by a fixed time, to reduce the total number of insertion points 1214, which decreases the accuracy of temporal placement of tracks in the cache list 200 while decreasing cache latency because there are fewer insertion points 400$_i$ to manage.

From blocks 1406, 1410 or if (at block 1408) the cache latency time is not above the high threshold nor below the low threshold, then if (at block 1412) the cache size has changed, the cache size 1204 is updated to the current cache size. From block 1414 or if (at block 1412) the cache size 1204 has not changed, then if (at block 1416) the track size has changed, the track size 1206 is updated to the current track size. A current total cache residency time is calculated (at block 1422), such as the difference of track timestamps 308 at the MRU end 202 and LRU end 204. If (at block 1422) the absolute value of the difference of the current total cache residency time and the previous saved total cache residency time 1210 exceeds a residency time threshold, then the total cache residency time threshold 1210 is updated to the calculated current total cache residency time. After updating (at block 1424) the total cache residency tie 1210 or if (at block 1422) the total cache residency time 1210 has not changed by the threshold, then if (at block 1426) one of the insertion point time differential 1212, cache size 1204, track size 1206 and/or total cache residency time 1210 has changed, then control proceeds (at block 1428) to FIG. 15 to calculate a new insertion point track interval number of tracks 1202. Otherwise, if (at block 1426) there is no change in one of the variables, control ends.

Figure 15:
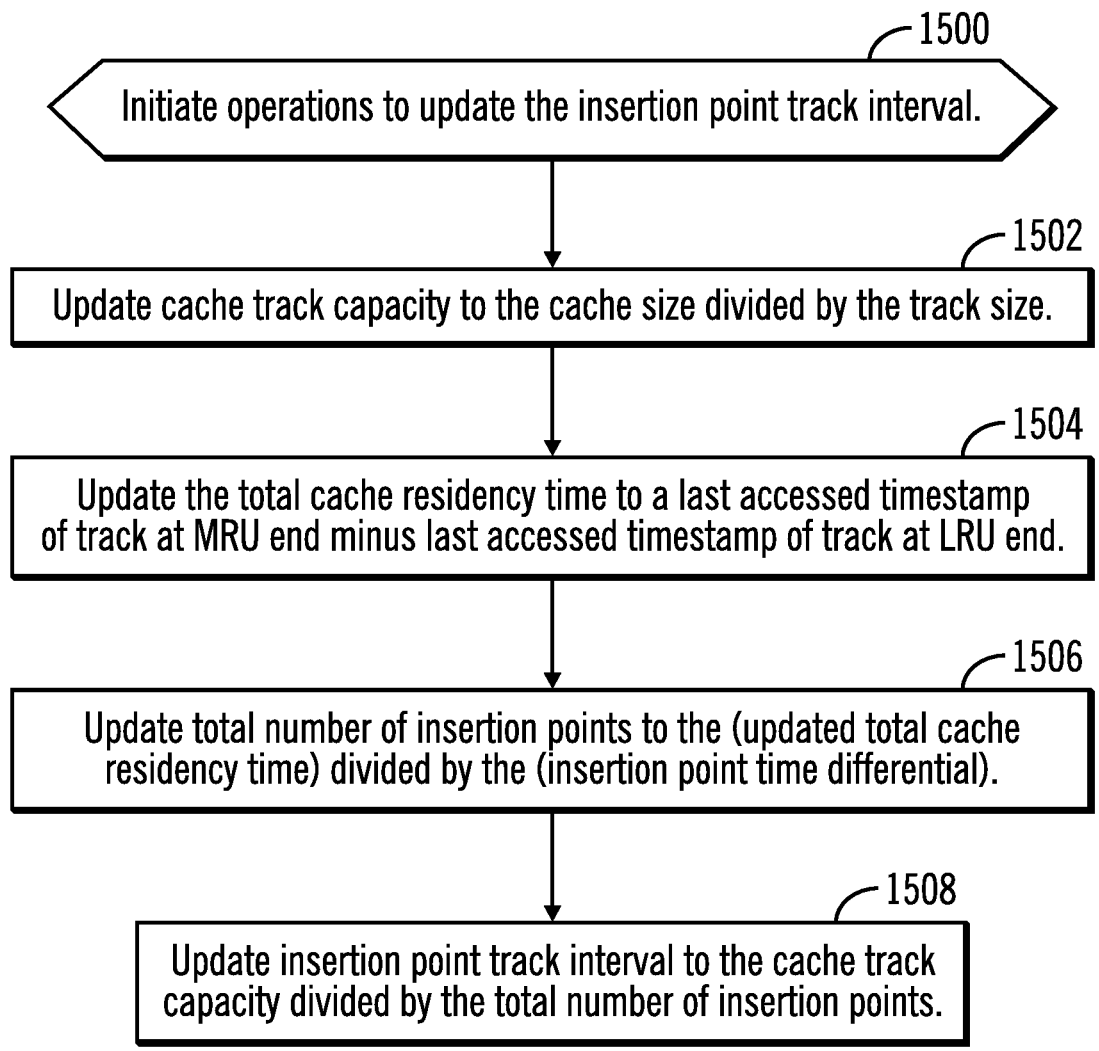
FIG. 15 illustrates an embodiment of operations to adjust the number of insertion points to maintain for a cache list.

FIG. 15 illustrates an embodiment of operations performed by the cache manager 120 to calculate the new insertion point track interval number of tracks 1202 based on changed conditions. Upon initiating (at block 1500) the update operations, the cache manager 120 updates (at block 1502) the cache track capacity 1208 as the cache size 1204 divided by the track size 1206. The total cache residency time 1210 is updated (at block 1405) to a last accessed timestamp 308 of the track at the MRU end 202 minus a last accessed timestamp 308 of the track at the LRU end 204. The total number of insertion points 1214 is updated (at block 1506) to the (updated total cache residency time 1210) divided by the (insertion point time differential 1212). The insertion point track interval 1202 is updated (at block 1408) to the cache track capacity 1208 divided by the total number of insertion points 1214.

With the embodiment of FIG. 15, the total number of insertion points 1214 may be updated based on changed operating conditions determined in FIG. 14 to optimize the number of insertion points to accommodate changes to the cache latency, track size, cache size, total cache residency time and other factors to maximize the number of insertion points that can be generated based on current operating conditions and cache latency. This allows for adjustment of the number of insertion points based on current cache latency conditions to a maximum number that does not cause cache latency to exceed a high threshold.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 16:
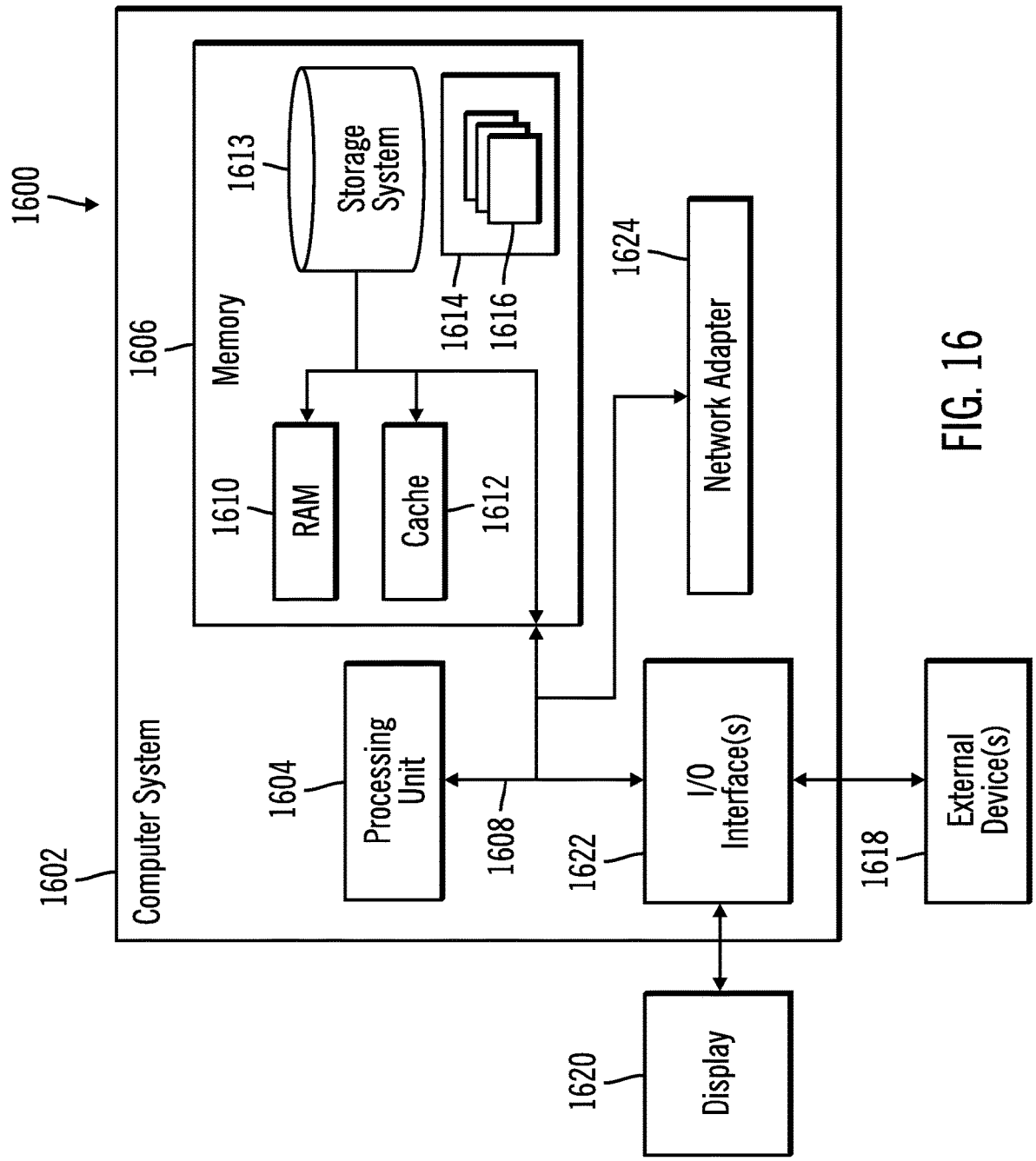
FIG. 16 illustrates a computing environment in which the components of FIG. 1 may be implemented.

The computational components of FIG. 1, including the hosts $102_1, 102_2 \ldots 102_n$ and storage controller 104, may be implemented in one or more computer systems, such as the computer system 1602 shown in FIG. 16. Computer system/ server 1602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, the computer system/server 1602 is shown in the form of a general-purpose computing device. The components of computer system/server 1602 may include, but are not limited to, one or more processors or processing units 1604, a system memory 1606, and a bus 1608 that couples various system components including system memory 1606 to processor 1604. Bus 1608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1602 typically includes a variety of computer system readable media. Such media may be any available media that is accessible by computer system/server 1602, and it includes both volatile and non-volatile media, removable and non-removable media.

System memory 1606 can include computer system readable media in the form of volatile memory, such as random access memory (RAM) 1610 and/or cache memory 1612. Computer system/server 1602 may further include other removable/non-removable, volatile/non-volatile computer system storage media. By way of example only, storage system 1613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1608 by one or more data media interfaces. As will be further depicted and described below, memory 1606 may include at least one program product having a set (e.g., at least one) of program modules that are configured to carry out the functions of embodiments of the invention.

Program/utility 1614, having a set (at least one) of program modules 1616, may be stored in memory 1606 by way of example, and not limitation, as well as an operating system, one or more application programs, other program modules, and program data. Each of the operating system, one or more application programs, other program modules, and program data or some combination thereof, may include an implementation of a networking environment. The components of the computer 1602 may be implemented as program modules 1616 which generally carry out the functions and/or methodologies of embodiments of the invention as described herein. The systems of FIG. 1 may be implemented in one or more computer systems 1602, where if they are implemented in multiple computer systems 1602, then the computer systems may communicate over a network.

Computer system/server 1602 may also communicate with one or more external devices 1618 such as a keyboard, a pointing device, a display 1620, etc.; one or more devices that enable a user to interact with computer system/server 1602; and/or any devices (e.g., network card, modem, etc.) that enable computer system/server 1602 to communicate with one or more other computing devices. Such communication can occur via Input/Output (I/O) interfaces 1622. Still yet, computer system/server 1602 can communicate with one or more networks such as a local area network (LAN), a general wide area network (WAN), and/or a public network (e.g., the Internet) via network adapter 1624. As depicted, network adapter 1624 communicates with the other components of computer system/server 1602 via bus 1608. It should be understood that although not shown, other hardware and/or software components could be used in conjunction with computer system/server 1602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing tracks in a storage in a cache, the computer program product comprising a computer readable storage medium having computer readable program code embodied therein that when executed performs operations, the operations comprising:
    maintaining a cache list indicating tracks stored in the cache, wherein the cache list has a least recently used (LRU) end and a most recently used (MRU) end and is used to manage tracks in the cache;
    determining an insertion point interval number comprising a number of tracks in the cache list between adjacent insertion points in the cache list;
    in response to adding to the cache list the insertion point interval number of tracks in the cache, creating an insertion point to indicate an entry in the cache list indicating one of the tracks indicated in the cache list; and
    determining an insertion point of a plurality of insertion points, including the created insertion point, indicating entries in the cache list between the MRU and LRU ends, to determine locations in the cache list at which to indicate tracks being added to the cache in the cache list.

2. The computer program product of claim 1, wherein a track indicated as the insertion point comprises a last track of the insertion point interval number of tracks indicated in the cache list.

3. The computer program product of claim 1, wherein the operations further comprise:
    determining a total cache residency time indicating a timespan during which all tracks have been indicated in the cache list since a time the tracks were last accessed; and
    determining the insertion point interval number of tracks at which to add insertion points to the cache list based on the total cache residency time.

4. The computer program product of claim 3, wherein the total cache residency time comprises a difference of a timestamp a track at the MRU end was last accessed and a timestamp a track at the LRU end was last accessed.

5. The computer program product of claim 3, wherein the determining the insertion point interval number of tracks at which to add insertion points comprises:
    determining a total number of insertion points for the cache list; and
    determining a cache track capacity comprising number of tracks capable of being stored in the cache, wherein the insertion point interval number of tracks comprises the cache track capacity divided by the total number of insertion points.

6. The computer program product of claim 5, wherein the operations further comprise:
    in response to determining a change to at least one of a track size, cache size, and the total cache residency time, performing:
    determining an updated cache track capacity by dividing the cache size by the track size;
    determining an updated total cache residency time;
    determining an updated total number of insertion points based on the updated total cache residency time; and
    determining an updated insertion point interval number of tracks at which to add insertion points to the cache list by dividing the updated cache track capacity by the updated total number of insertion points.

7. The computer program product of claim 5, wherein the determining the insertion point interval number of tracks further comprises:
    determining an insertion point time differential indicating a time difference between two insertion points in the cache list, wherein the determining the total number of insertion points comprises dividing the total cache residency time by the insertion point time differential.

8. The computer program product of claim 7, wherein the operations further comprise:
    determining whether a cache latency exceeds a threshold condition;
    calculating an updated insertion point time differential comprising the insertion point time differential adjusted by a fixed time in response to determining that the cache latency exceeds the threshold condition; and
    determining an updated total number of insertion points by dividing a current total cache residency time by the updated insertion point time differential.

9. The computer program product of claim 1, wherein an insertion point timestamp is associated with each insertion point, wherein to determining locations in the cache list at which to indicate tracks in the cache list comprises:
    determining a first insertion point starting from the LRU end having an insertion point timestamp greater than a last accessed timestamp of the track to indicate in the cache list, wherein the determined locations in the cache list at which to indicate the tracks comprises the determined first insertion point.

10. A system for managing tracks in a storage in a cache, comprising:
    a processor;
    a cache; and
    a computer readable storage medium having computer readable program code embodied therein that when executed by the processor performs operations, the operations comprising:
        maintaining a cache list indicating tracks stored in the cache, wherein the cache list has a least recently used (LRU) end and a most recently used (MRU) end and is used to manage tracks in the cache;
        determining an insertion point interval number comprising a number of tracks in the cache list between adjacent insertion points in the cache list;
        in response to adding to the cache list the insertion point interval number of tracks in the cache, creating an insertion point to indicate an entry in the cache list indicating one of the tracks indicated in the cache list; and
        determining an insertion point of a plurality of insertion points, including the created insertion point, indicating entries in the cache list between the MRU and LRU ends, to determine locations in the cache list at which to indicate tracks being added to the cache in the cache list.

11. The system of claim 10, wherein a track indicated as the insertion point comprises a last track of the insertion point interval number of tracks indicated in the cache list.

12. The system of claim 10, wherein the operations further comprise:

determining a total cache residency time indicating a timespan during which all tracks have been indicated in the cache list since a time the tracks were last accessed; and determining the insertion point interval number of tracks at which to add insertion points to the cache list based on the total cache residency time.

13. The system of claim 12, wherein the determining the insertion point interval number of tracks at which to add insertion points comprises:

determining a total number of insertion points for the cache list; and determining a cache track capacity comprising number of tracks capable of being stored in the cache, wherein the insertion point interval number of tracks comprises the cache track capacity divided by the total number of insertion points.

14. The system of claim 13, wherein the determining the insertion point interval number of tracks further comprises:

determining an insertion point time differential indicating a time difference between two insertion points in the cache list, wherein the determining the total number of insertion points comprises dividing the total cache residency time by the insertion point time differential.

15. The system of claim 14, wherein the operations further comprise:

determining whether a cache latency exceeds a threshold condition;

calculating an updated insertion point time differential comprising the insertion point time differential adjusted by a fixed time in response to determining that the cache latency exceeds the threshold condition; and determining an updated total number of insertion points by dividing a current total cache residency time by the updated insertion point time differential.

16. A method for managing tracks in a storage in a cache, comprising:

maintaining a cache list indicating tracks stored in the cache, wherein the cache list has a least recently used (LRU) end and a most recently used (MRU) end and is used to manage tracks in the cache;

determining an insertion point interval number comprising a number of tracks in the cache list between adjacent insertion points in the cache list;

in response adding to the cache list the insertion point interval number of tracks in the cache, creating an insertion point to indicate an entry in the cache list indicating one of the tracks indicated in the cache list; and determining an insertion point of a plurality of insertion points, including the created insertion point, indicating entries in the cache list between the MRU and LRU ends, to determine locations in the cache list at which to indicate tracks being added to the cache in the cache list.

17. The method of claim 16, wherein a track indicated as the insertion point comprises a last track of the insertion point interval number of tracks indicated in the cache list.

18. The method of claim 16, further comprising:

determining a total cache residency time indicating a timespan during which all tracks have been indicated in the cache list since a time the tracks were last accessed; and determining the insertion point interval number of tracks at which to add insertion points to the cache list based on the total cache residency time.

19. The method of claim 18, wherein the determining the insertion point interval number of tracks at which to add insertion points comprises:

determining a total number of insertion points for the cache list; and determining a cache track capacity comprising number of tracks capable of being stored in the cache, wherein the insertion point interval number of tracks comprises the cache track capacity divided by the total number of insertion points.

20. The method of claim 19, wherein the determining the insertion point interval number of tracks further comprises:

determining an insertion point time differential indicating a time difference between two insertion points in the cache list, wherein the determining the total number of insertion points comprises dividing the total cache residency time by the insertion point time differential.

21. The method of claim 20, further comprising:

determining whether a cache latency exceeds a threshold condition;

calculating an updated insertion point time differential comprising the insertion point time differential adjusted by a fixed time in response to determining that the cache latency exceeds the threshold condition; and determining an updated total number of insertion points by dividing a current total cache residency time by the updated insertion point time differential.

22. The computer program product of claim 1, wherein the created insertion point indicates the entry in the cache list of a track at the LRU end of the cache list.

23. The system of claim 10, wherein the created insertion point indicates the entry in the cache list of a track at the LRU end of the cache list.

24. The method of claim 16, wherein the created insertion point indicates the entry in the cache list of a track at the LRU end of the cache list.

* * * * *